Figure 1:
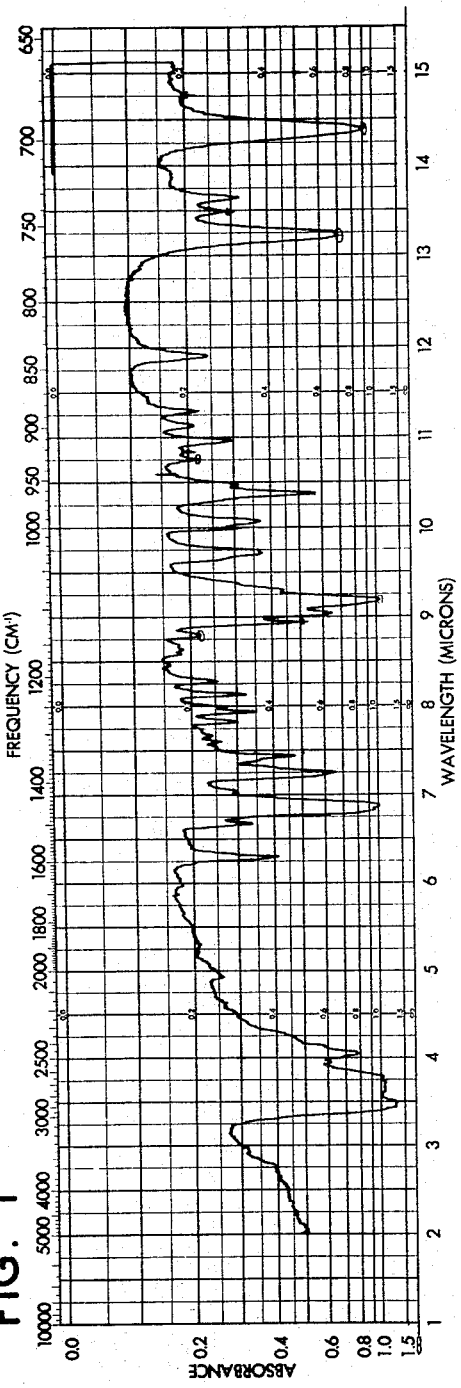

INVENTOR
CHRISTOPHER J. TSCHARNER
BY Karl F. Jorda
ATTORNEYS

INVENTOR
CHRISTOPHER J. TSCHARNER
BY Karl F Jorda
ATTORNEYS

United States Patent Office 3,282,936
Patented Nov. 1, 1966

3,282,936
PROCESS FOR THE CONVERSION OF CIS-2-PHENYL-3-METHYLMORPHOLINE TO TRANS-2-PHENYL-3-METHYLMORPHOLINE
Christopher J. Tscharner, Warwick, R.I., assignor to Geigy Chemical Corporation, Greenburgh, N.Y., a corporation of Delaware
Filed May 1, 1963, Ser. No. 277,399
6 Claims. (Cl. 260—247)

This invention relates to an improvement in the production of 2-phenyl-3-methylmorpholine and more particularly to the conversion of cis-2-phenyl-3-methylmorpholine and more particularly to the conversion of cis-2-phenyl3-methylmorpholine, which is a by-product in the commercial manufacture of 2-phenyl-3-methylmorpholine, to the desirable trans-isomer of 2-phenyl-3-methylmorpholine.

2-phenyl-3-methylmorpholine or 2-phenyl-3-methyltetrahydro-1,4-oxazine (also generically known as phenmetrazine) is, in the form of its hydrochloride, a valuable commercial product which is sold as an effective anorectic agent for the treatment of overweight persons.

A process for the preparation of 2-phenyl-3-methylmorpholine hydrochloride wherein a substituted diethanolamine, β-phenyl-α-methyl-β,β'-dihydroxydiethylamine, is cyclized in sulfuric acid, extracted as a base, distilled and transformed into the hydrochloride is described and claimed in U.S. Patent No. 2,835,669.

The product obtained can exist in the following isomeric forms, each of which represents a racemic mixture of d and l form:

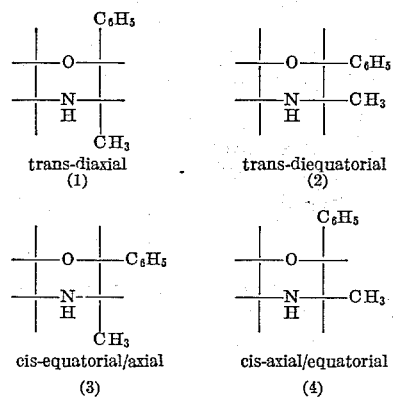

trans-diaxial (1)
trans-diequatorial (2)
cis-equatorial/axial (3)
cis-axial/equatorial (4)

On the basis of stereochemical considerations, the diequatorial trans-product (2) (herein referred to as trans-product, -isomer, -2-phenyl-3-methylmorpholine, etc.) is the stable form and is produced in the highest yields (about 95–97%), while the cis-form (3) (herein called cis-product, -isomer, -2-phenyl-3-methylmorpholine, etc.) is formed in yields of about 3–5%; it is unlikely that there is any yield of isomeric forms (1) and (4).

2-phenyl-3-methylmorpholine as commercial product exists in the form of the trans-isomer because in the regular 2-phenyl-3-methylmorpholine manufacturing process the cis-isomer is eliminated due to its higher solubility in acetone which is used as solvent for making the hydrochloride.

The acetone mother liquors thus contain in addition to some trans-product also dissolved in acetone; a rich fraction of cis-product which, after the acetone has been distilled off, remains in the brown, syrupy solution which has hitherto been discarded as a waste product.

I have now found that the heretofore ignored cis-product can surprisingly and unexpectedly be converted to the commercially desired trans-product by treating the cis-product with sulfuric acid whereby the morpholine ring is opened and closed again. As in the initial cyclization described above, formation of trans- and cis-isomers takes place in the same ratio, i.e., trans-product is formed in yields of about 95–97% and cis-product, in yields of about 3–5%. It is readily obvious that the greatest proportion of formerly useless 2-phenyl-3-methylmorpholine is thus recovered and that such recovery is of great commercial significance.

The inventive process can be illustrated in a schematic way as follows:

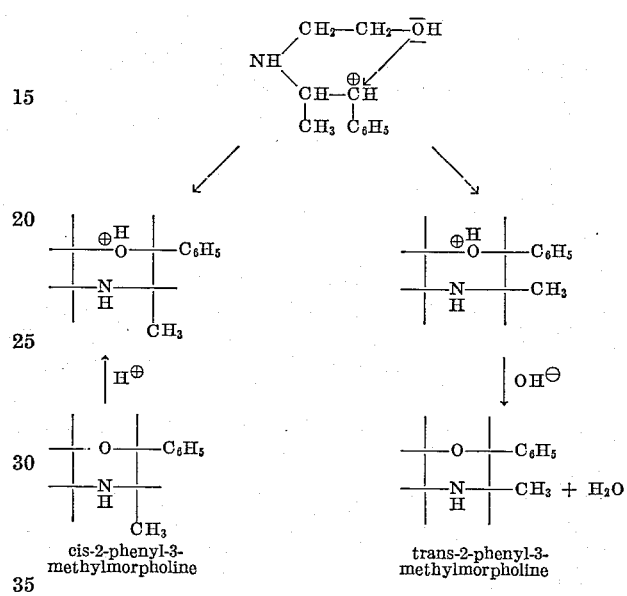

cis-2-phenyl-3-methylmorpholine
trans-2-phenyl-3-methylmorpholine

As can be seen from the above illustration, the underlying mechanism involves a proton attack on the ring oxygen of the morpholine.

In one aspect, the present invention pertains to a process of converting cis-2-phenyl-3-methylmorpholine to trans-2-phenyl-3-methylmorpholine by treating the cis-compound with concentrated sulfuric acid. This is preferably done at elevated temperatures ranging between about 50° C. and 100° C. for about 10 to 20 hours, and more particularly, by heating the reaction mixture to about 90° C. to 100° C. for about 2 to 3 hours and maintaining the reaction mixture at a temperature between about 50° C. to about 65° C. for about 12 hours. The desired trans-compound is then recovered as usual.

In another aspect, the instant invention is concerned with an improvement in the process for producing trans-2-phenyl-3-methylmorpholine by cyclizing β-phenyl-α-methyl-β,β'-dihydroxydiethylamine in sulfuric acid and transforming the 2-phenyl-3-methylmorpholine obtained as free base and as isomeric mixture of the trans- and cis-compound to the hydrochloride in acetone solution, the improvement consisting in recovering from said acetone solution the cis-compound preferentially dissolved therein and treating said cis-compound with concentrated sulfuric acid as described above. The cis-2-phenyl-3-methylmorpholine is thereby converted to additional trans-2-phenyl-3-methylmorpholine. In the practical application of this process it is preferable to store the acetone mother liquors left from the regular manufacturing process or the residue therefrom after the acetone has been distilled off and to process the accumulated cis-compound admixed with some trans-compound in larger quantities.

More specifically, the practice of the subject process involves rendering alkaline—to neutralize the hydrochloric acid present—the syrupy residue left after stripping the solvent from the mother liquor in the regular phenmetrazine manufacturing process; extracting the free base of cis- and trans-2-phenyl-3-methylmorpholine obtained with toluene or merely separating it as is, the latter being preferably in operations on a larger scale; mixing the free base preferably under vigorous agitation, with concentrated sulfuric acid, about 85–92% and preferably about 88–90%; heating the reaction mixture under slow agitation to about 90° C. to 100° C., maintaining the reaction mixture at this temperature for about 2 to 3 hours and then for about 4 hours at a temperature of about 60° C. to about 65° C. and finally for about 8 hours at a temperature of about 50° C. to about 55° C. and working up the desired reaction product, trans-2-phenyl-3-methylmorpholine, in the usual way, e.g., by pouring on ice, making alkaline, extracting with ether or toluene, purifying by distillation and converting into the hydrochloride.

The following examples are illustrative of the process of the present invention but are not to be construed in a limiting sense.

*Example 1*

To a 250 ml. three-neck flask 100 volume parts of sulfuric acid (96% conc.) plus 10 volume parts of water were charged. Under agitation 50 weight parts of distilled base, i.e., 2-phenyl-3-methylmorpholine isolated from acetone mother liquor (cis- plus trans-product), were added dropwise over a ½ hour period. The temperature was maintained at 50° C. by means of an ice bath. After the addition was completed the mixture was heated to 100° C. for two hours. Then a temperature of 60° C. was maintained for four hours and finally a temperature of 50° C., for eight hours. The reaction mixture was added to an ice water mixture, neutralized with sodium hydroxide and the pH brought to 12. The base was extracted with ethyl ether. The ether solution was dried and ethyl ether stripped. 47 g. of crude base were obtained. This base was distilled and the following fractions were collected:

|   | Grams |
|---|---|
| (1) Forerun | 4.0 |
| (2) Main fraction | 35.8 |
| (3) After run | 2.5 |

34 g. of the main fraction were transformed into trans-2-phenyl-3-methylmorpholine hydrochloride. Yield: 35 g. of trans-2-phenyl-3-methylmorpholine hydrochloride; M.P. 176–178.6° C.

*Example 2*

This conversion was demonstrated in an experiment using 50 g. of an enriched 18–20% cis-starting base. Following the procedure described in the above example, 49 g. of crude base were obtained. The distillation gave the following fractions:

(1) 90° C.—1 g. (picrate M.P. ok, $n_D^{20}=1.5398$)
(2) 90–91° C.—31 g. (picrate M.P. ok, $n_D^{20}=1.5393$)
(3) 91–92° C.—8 g. (picrate M.P. ok, $n_D^{20}=1.540$)
(4) 92–95° C.—2 g. (picrate M.P. ok, $n_D^{20}=1.541$)
(5) 7 g. of brown residue.

$[n]_D^{20}$ of regular trans-2-phenyl-3-methylmorpholine base=1.538±0.002. 40 g. of combined Fractions 1–4 were taken and transformed into the hydrochloride. Yield: 42 g. of hydrochloride; M.P. 176.2–178.8° C.

*Example 3*

On a larger scale, 628.2 kg. of regular mother liquor containing cis-2-phenyl-3-methylmorpholine were transformed into trans-2-phenyl-3-methylmorpholine in accordance with the procedure given in Example 1. 503 kg. were obtained; yield 80.1%.

EVIDENCE FOR THE CONVERSION (1) A sample of mother liquor 2-phenyl-3-methylmorpholine (content of 17–20% of cis-product according to gas chromatographic analysis) was transformed into the hydrochloride. The melting point of the product was 128°–142° C. Two different picrates were obtained, the typical cis- and the typical trans-picrate.

(2) A sample of the same material as was used in Example 1 was treated according to the subject method. The hydrochloride obtained of the trans-product gave a melting point of 176.2°–178.8° C.

(3) A picrate of a regular mother liquor 2-phenyl-3-methylmorpholine gave a melting point of 170° C. After the conversion or isomerization the picrate showed the typical trans-properties; M.P. 190°–194° C.

(4) The regular mother liquor 2-phenyl-3-methylmorpholine showed a cis-band in the gas chromatogram. Even after a distillation the band was still there. The converted distilled product did not show these cis-bands and only one kind of picrate, the trans-picrate (M.P. 190°–194° C.) was precipitated.

(5) The regular mother liquor 2-phenyl-3-methylmorpholine hydrochloride showed typical cis-bands in the IR spectrum at 8.95μ; 10.85μ; 13.50μ; 14.75μ. See arrows in the IR spectrum, FIGURE 1. (Compare also with spectrum, FIGURE 4.) After conversion, these bands disappeared. See IR spectrum, FIGURE 2, which is the IR spectrum of the 2-phenyl-3-methylmorpholine hydrochloride after conversion.

Figure 2:
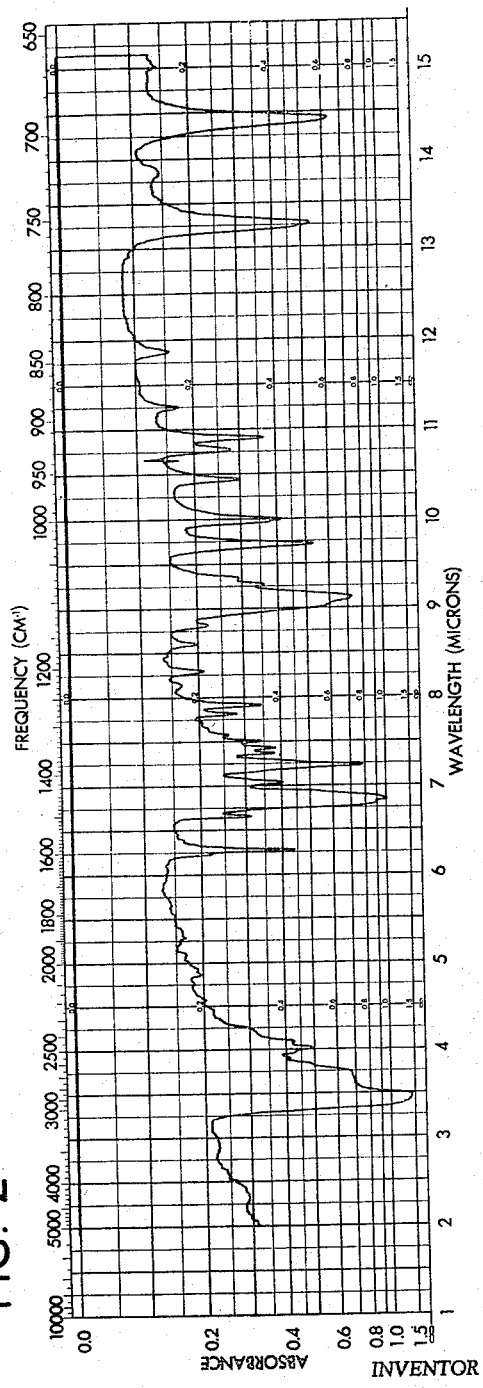
Figure 3:
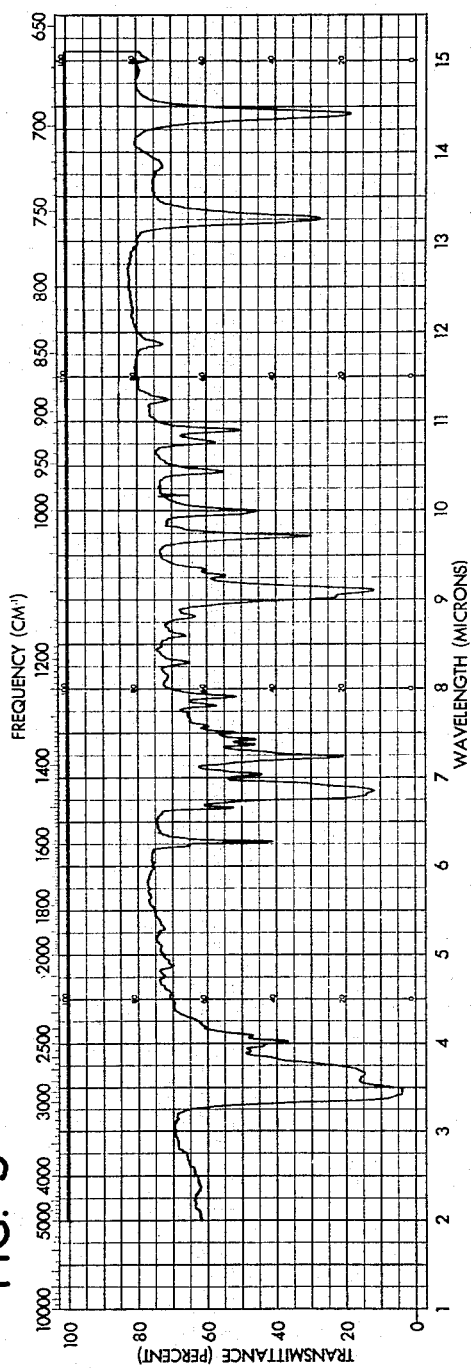

Some typical bands of spectrum, FIGURE 1, are shifted after the conversion. Compare circles in spectrum, FIGURE 1, at 8.80μ; 9.20μ; 10.75μ; 13.20μ; 14.40μ with spectrum, FIGURE 2. The spectrum of FIGURE 2 is absolutely identical with the spectrum of FIGURE 3, which is the spectrum for a regular trans-2-phenyl-3-methylmorpholine hydrochloride obtained with the standard trans-2-phenyl-3-methylmorpholine process.

Figure 4:
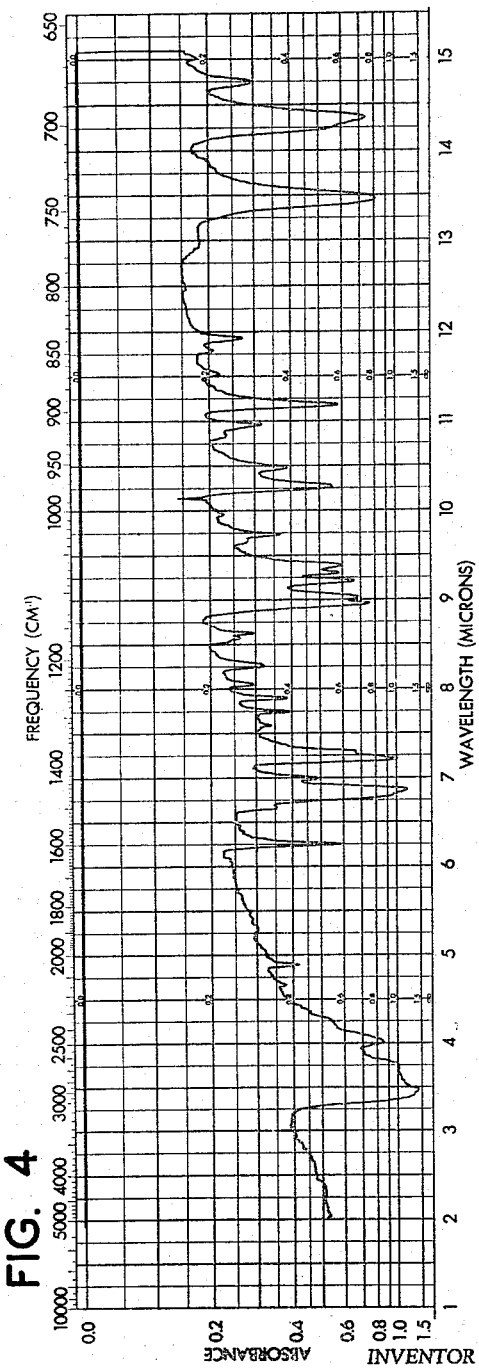

The spectrum of FIGURE 4 is one of pure cis-2-phenyl-3-methylmorpholine hydrochloride.

What is claimed is:

1. The process of converting cis-2-phenyl-3-methylmorpholine to trans-2-phenyl-3-methylmorpholine which comprises treating cis-2-phenyl-3-methylmorpholine with concentrated sulfuric acid.

2. The process of converting cis-2-phenyl-3-methylmorpholine to trans-2-phenyl-3-methylmorpholine which comprises treating cis-2-phenyl-3-methylmorpholine with concentrated sulfuric acid at elevated temperatures ranging between about 50° C. and 100° C. for about 10 to 20 hours, and recovering the desired trans-2-phenyl-3-methylmorpholine.

3. In the process of converting cis-2-phenyl-3-methylmorpholine to trans-2-phenyl-3-methylmorpholine the steps which comprise mixing under agitation cis-2-phenyl-3-methylmorpholine with concentrated sulfuric acid, heating the reaction mixture to about 90° C. to 100° C. for about 2 to 3 hours, maintaining the reaction mixture at a temperature between about 50° C. to 65° C. for about 12 hours and recovering the desired trans-2-phenyl-3-methylmorpholine.

4. In the process for producing trans-2-phenyl-3-methylmorpholine by cyclizing β-phenyl-α-methyl-β,β'-dihydroxydiethylamine in sulfuric acid and transforming the 2-phenyl-3-methylmorpholine obtained as free base and as isomeric mixture of trans- and cis-2-phenyl-3-methylmorpholine to the hydrochloride in acetone solution the improvement which consists in recovering from said acetone solution cis-2-phenyl-3-methylmorpholine preferentially dissolved therein and treating said cis-2-phenyl-3-methylmorpholine with concentrated sulfuric acid thereby converting said cis-2-phenyl-3-methylmorpholine to additional trans-2-phenyl-3-methylmorpholine.

5. In the process for producing trans-2-phenyl-3-methylmorpholine by cyclizing β-phenyl-α-methyl-β,β'-dihydroxydiethylamine in sulfuric acid and transforming the 2-phenyl-3-methylmorpholine obtained as free base and as isomeric mixture of trans- and cis-2-phenyl-3-methylmorpholine to the hydrochloride in acetone solution, the improvement which consists in recovering from said acetone solution cis-2-phenyl-3-methylmorpholine preferentially dissolved therein and treating said cis-2-phenyl-3-methylmorpholine with concentrated sulfuric acid at elevated temperatures ranging between about 50° C. and 100° C. until said cis-2-phenyl-3-methylmorpholine is converted to additional trans-2-phenyl-3-methylmorpholine and recovering the additional trans-2-phenyl-3-methylmorpholine.

6. In the process for producing trans-2-phenyl-3-methylmorpholine by cyclizing β-phenyl-α-methyl-β,β'-dihydroxydiethylamine in sulfuric acid and transforming the 2-phenyl-3-methylmorpholine obtained as free base and as isomeric mixture of trans- and cis-2-phenyl-3-methylmorpholine to the hydrochloride in acetone solution, the improvement which consists in recovering from said acetone solution cis-2-phenyl-3-methylmorpholine preferentially dissolved therein, mixing under agitation cis-2-phenyl-3-methylmorpholine with concentrated sulfuric acid, heating the reaction mixture to about 90° C. to 100° C. for about 2 to 3 hours, maintaining the reaction mixture at a temperature between about 50° C. to 65° C. for about 12 hours and recovering the desired additional trans-2-phenyl-3-methylmorpholine.

References Cited by the Examiner

UNITED STATES PATENTS

| 3,025,293 | 3/1962 | Kalm et al. | 260—247 |
| 3,113,137 | 12/1963 | Shaeran et al. | 260—327 |

OTHER REFERENCES

Clarke: Jour. Org. Chem., vol. 27, pages 3251–3253 (September 1962).

Foltz et al.: Jour. Am. Chem. Soc., vol. 79, pages 201–205 (1957).

ALEX MAZEL, *Primary Examiner.*

ROBERT L. PRICE, JOSE TOVAR, *Assistant Examiners*

UNITED STATES PATENT OFFICE
CERTIFICATE OF CORRECTION

Patent No. 3,282,936                      November 1, 1966

Christopher J. Tscharner

It is hereby certified that error appears in the above numbered patent requiring correction and that the said Letters Patent should read as corrected below.

Column 1, lines 14 and 15, strike out "and more particularly to the conversion of cis-2-phenyl3-methyl-morpholine."; in column 2, the arrow on the left-hand side is pointed downward and should be pointed toward the top formula.

Signed and sealed this 5th day of September 1967.

(SEAL)
Attest:

ERNEST W. SWIDER                      EDWARD J. BRENNER
Attesting Officer                        Commissioner of Patents